Patented Apr. 29, 1930

1,756,252

UNITED STATES PATENT OFFICE

BORIS N. LOUGOVOY, OF MONTCLAIR, NEW JERSEY, ASSIGNOR TO ELLIS-FOSTER COMPANY, OF MONTCLAIR, NEW JERSEY, A CORPORATION OF NEW JERSEY

SYNTHETIC PRODUCT AND PROCESS OF MAKING SAME

No Drawing.    Application filed April 21, 1924. Serial No. 708,017.

This invention relates to a synthetic resin and to the process of making same and relates particularly to resinous substances prepared from formaldehyde, urea and phenol, or their equivalents, and appropriate substitutes.

In preparing a resin under the preferred procedure of the present invention I preferably employ certain proportions of urea and formaldehyde which will serve to form a complex or base capable of uniting with phenol or phenol and formaldehyde to yield a product which is substantially free from any of the reacting constituents and which is not a mixture of urea-formaldehyde resin and phenol-formaldehyde resin but is a substance of unique properties derived from the inter-reaction of the several constituents to form such complex.

Thus I may use two molecular proportions of urea to four molecular proportions of formaldehyde and one molecular proportion of phenol. Looking at the reaction from one angle it may be considered a combination between two mols. of dimethylol urea and one mol. of phenol.

Thus a proportion may be employed of 120 parts by weight of urea, 320 parts of aqueous formaldehyde of approximately 37 to 40 per cent strength and 94 parts of phenol, to which is added an acid substance which has a beneficial catalytic effect, 20 parts by weight of phthalic anhydride being suitable for the purpose. A clear solution is obtained which on careful heating will in a few minutes time become decidedly milky. Using proportions in grams according to the quantity indicated above and heating with a small flame I found that milkiness occurred in about 12 minutes and at the end of 15 minutes the reaction mixture was boiling spontaneously. After removal of the flame the boiling continued for a matter of 5 minutes or so when separation into two layers occurred and the boiling stopped. Then I applied a flame to the flask containing the solution heating for 10 minutes longer when the bottom layer became a white gummy mass. I poured off the aqueous acid upper layer and on cooling the lower layer obtained a pure white hard mass of resinous fracture. This is not soluble in hot alcohol, acetone nor benzol. Some water remained in this hard mass and I crushed the material to a coarse powder and dried in a vacuum dryer at 28 or 29 inches vacuum gage, raising the temperature gradually to 90° C. The powdered or granular material obtained in this way when boiled with water gave an acid reaction to litmus. I found the powder could be molded at 120° C. in a hydraulic press at 2000 pounds pressure and that on subjecting to this temperature for a period of 5 minutes I obtained a molded article which was fairly rigid when hot and could be removed from the mold without the necessity of cooling. It had therefore the property of curing or becoming thermo-rigid under these conditions. The molded articles obtained were strong, translucent and light in color, free from any yellow or reddish discoloration. The use of a mild organic acid or anhydride giving the whole composition an acid reaction is I believe responsible for orientation of the reaction in such a way that colored substances such as are formed when phenol and formaldehyde react are not generated.

On the other hand when the reaction mixture was treated with a base, or for example hexamethylenetetramine added, a molded article was obtained of a reddish-brown color under the same conditions. This material was so discolored as to be totally unfit in the production of light colored and especially white molded articles serving as substitutes for ivory, porcelain and the like.

Hence I prefer to not have present any alkaline substance or basic material or catalyst of that character because of the discoloring effect and also because in some cases there appears to be an attendant destructive or disintegrating action brought about by an alkaline catalyst which distinctly impairs the quality of the product. However broadly speaking so far as that phase of the invention is concerned which relates to the reaction of a mixture of approximately 2 mols. of urea, 4 mols. of formaldehyde and 1 mol. of phenol, or as stated a ratio or proportion which suggests reaction between 1 mol. of phenol and 2 mols. of dimethylol urea, I do not wish to be restricted to the precise catalyst employed and there might be circumstances under which I would wish to employ a basic catalyst, and possibly others where I would wish to have the solution neutral or free from catalytic substances of either an alkaline or an acid character. The present invention however relates in its preferred aspects to the employment of an acid catalyst which I believe as I have already indicated has a peculiar and specific orienting influence and which furthermore does not bring about the highly undesirable discoloration and reactions caused by basic catalytic substances.

In another case I heated a mixture composed of 60 parts by weight of urea, 160 parts of aqueous formaldehyde, 47 parts of phenol and 5 parts of phthalic anhydride. In this case the proportion of the acid accelerator was reduced one-half the amount used in the example given above. The reaction was not so violent and on heating for 20 minutes while a milky solution or incipient emulsion was obtained there was no definite separation or coagulation such as marked the progress of the reaction after that period of heating when employing double the amount of acid catalyst. On evaporating on hot plate a small sample of this solution I obtained a non-volatile or resinous content of 62 per cent. This determination was made in order to ascertain the proportion of filling material I could use advantageously in preparing a molding composition. I found that the milky solution after 20 minutes heating could be diluted with an equal volume of alcohol without precipitation and I used this milky solution or suspension as a means to incorporate the resin with filling material, in this case 50 parts by weight of titanox and 150 parts of cotton linters. These fillers were used because it was an object to obtain a white or ivory colored molded material. The composition was dried in a vacuum dryer with a vacuum gage pressure of approximately 28–29 inches, the temperature being raised gradually to 90° C. The composition was then pulverized and tests were made at different molding temperatures. It was found that the temperature of the hot press could range from 120° C. to about 150° C. without formation of blisters on the molded article. Even at 150° C. there was no sticking to the mold and the article cured or became a thermo-rigid mass in 3 to 5 minutes. A pressure on the ram of 2000 to 3000 pounds was employed. A feature about the product molded at 150° C. for 5 minutes or thereabouts was that it proved to be quite resistant to water, the surface not being materially affected on soaking in cold water for a long period nor by boiling for a short time. The molded article had a white or ivory-colored appearance with a smooth attractive surface. A test disc 2 inches in diameter and $\frac{3}{32}$nds of an inch in thickness was tested in a breaking machine by being supported at three points near the periphery and applying pressure at a point in the center the disc broke at a pressure of about 49 pounds which indicates the strength to be fairly high, especially when employing a considerable proportion of non-fibrous mineral filler.

In the foregoing examples it will be noted that I have used aqueous formaldehyde in the commercial form which contains approximately 37–40 per cent of actual formaldehyde. It is possible to carry out the reaction with formaldehyde of other strengths with or without a diluent such as water or organic vehicles. Also the reaction may be carried out under anhydrous conditions by employing paraform or other form of polymerized formaldehyde. The invention is not limited to formaldehyde and its polymers but also includes the use of other appropriate aldehydes. Neither do I wish to be limited to the exact proportions of 2 mols. of urea to 4 mols. of formaldehyde and 1 mol. of phenol as there is some latitude in these proportions as will be evident to anyone who undertakes to carry out the present invention. Likewise it should be understood that where urea is mentioned other compounds which are the equivalent of urea or possess analogous behavior including any of the thioureas, substituted carbamides etc. may be employed in a more or less effective manner. In like fashion while I prefer to use phthalic anhydride or phthalic acid I may employ other acids such for example as formic, oxalic, citric, tartaric acids and the like and even in some cases may resort to the addition of small amounts of phosphoric or other mineral acids. However such mineral acids ordinarily have a rather harsh action on molds and I prefer to use a relatively mild organic acid or anhydride which does not have a destructive action on the metal of which molds are constructed. Furthermore the invention is not limited to the use of phenol but appropriate cresols, naphthols and the like may be employed as additions to replace a part or the entire amount of the phenol if desired. It may be added that while I prefer to make light colored or white material it is feasible to add dyes or pigments to color to various shades as may be required.

In making a molding composition I prefer to use a considerable proportion of a fibrous filler such as wood flour, asbestos, cotton flock or linters. The last mentioned filler has given the most satisfactory results from the standpoint of light color. However it is desirable to add a moderate amount of a white mineral filler to overcome what may be termed a starchy appearance of the molded product made with linters as the sole filler. The addition of a strong white pigment improves the color and affords a means of regulating the opacity to the step desired. White pigments such as titanox or lithopone are preferable to zinc oxide as the latter may neutralize the acid catalyst during the molding operation and cause substances to be formed which are affected by water. Hence I prefer to avoid any pigment of a basic nature when it is an object to produce articles of high water resistance.

The fillers may be incorporated with the resinous binder by impregnation or admixture of a solution or suspension of the resin or the latter may be dried and ground in a ball mill with the filler then passed through mixing rolls to thoroughly incorporate the various components.

What I claim is:—

1. A white solid comprising the reaction product of a phenolic body on dimethylol urea.
2. A product comprising the complex from the reaction of a phenolic body on a methylolurea.
3. A molding composition containing the crushed and dried reaction product of a phenolic body on a methylolurea.
4. A molding composition containing the crushed and dried reaction product of a phenolic body on a methylolurea incorporated with a filler.
5. A molding composition containing the crushed and dried reaction product of a phenolic body on a methylolurea containing a filler, the opacity of the final product made therefrom being determined by the amount of filler therein.
6. A process which comprises preparing a reaction material from urea and formaldehyde, and then treating the reaction material with a phenol in an acid medium.
7. A process as set forth in claim 6, in which the reaction product from urea and formaldehyde is prepared in an organic vehicle.
8. A process which comprises preparing a reaction material from urea and formaldehyde, and then treating the reaction material with a phenol and formaldehyde.
9. A reaction product of a phenolic body upon an acid-containing methylolurea product.
10. A reaction product of a phenolic body upon an organic acid-containing methylolurea product.
11. A reaction product of a phenolic body upon a phthalic acid-containing methylolurea product.
12. A molding composition containing the crushed and dried reaction product of a phenolic body on a product derived by reacting an aldehyde with a carbamid derivative.
13. A molding composition containing the crushed and dried reaction product of a phenolic body on an acid-containing reaction product of an aldehyde and a carbamid derivative.
14. A condensation product produced by the action of phenol and formaldehyde on a reaction product of urea and formaldehyde.
15. A molding composition containing a urea-phenol-formaldehyde reaction product capable of being molded at temperatures of from 120° C. to 150° C. without substantial blistering.
16. A molding composition containing the reaction product of a phenolic body upon a methylolurea and being capable of being molded at a temperature of from 120° C. to 150° C. without substantial blistering.
17. A urea-phenol-formaldehyde reaction product molded at a temperature of from 120 to 150° C.
18. A condensation reaction product from phenol, formaldehyde and a carbamid compound corresponding to the formula $NR_2CXNR_2$ in which X is an atom of the oxygen-sulphur group, which compound is capable of forming an amorphous condensation product with formaldehyde.
19. A molded ivory-colored urea-formaldehyde-phenol reaction product.
20. A reaction product of phenol upon an acid-containing methylolurea product.
21. A molded ivory-colored urea-formaldehyde-phenol acid reacted body.
22. A molding composition containing a crushed and dried reaction product of phenol on a methylolurea.
23. A urea-phenol-polymerized-formaldehyde reaction product.
24. A process for manufacturing condensation products of urea with formaldehyde which comprises heating methylolurea with phenol in an acid medium until a condensation product is formed.
25. The process which comprises heating a urea phenol formaldehyde reaction product at a temperature of from 120 to 150° C.
26. The process which comprises heat treating the reaction product of a phenolic body upon a methylolurea at temperatures of from 120 to 150° C.
27. The process which comprises forming a urea formaldehyde reaction product, and then heating such product at a temperature of from 120 to 150° C.
28. A molding composition comprising the complex from the reaction of a phenolic body on a methylolurea, and a filler.

BORIS N. LOUGOVOY.